US009438813B2

(12) United States Patent
Gilbert (10) Patent No.: US 9,438,813 B2
(45) Date of Patent: Sep. 6, 2016

(54) LIGHTING SYSTEM AND METHOD FOR IMAGE AND OBJECT ENHANCEMENT (71) Applicant: DOLBY LABORATORIES LICENSING CORPORATION, San Francisco, CA (US)

(72) Inventor: John Gilbert, Pacifica, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 14/381,755

(22) PCT Filed: Mar. 7, 2013

(86) PCT No.: PCT/US2013/029512
§ 371 (c)(1),
(2) Date: Aug. 28, 2014

(87) PCT Pub. No.: WO2013/138148
PCT Pub. Date: Sep. 19, 2013

(65) Prior Publication Data
US 2015/0036023 A1 Feb. 5, 2015

Related U.S. Application Data (60) Provisional application No. 61/610,293, filed on Mar. 13, 2012.

(51) Int. Cl.
*H04N 9/31* (2006.01)
*H04N 5/235* (2006.01)
(Continued)

(52) U.S. Cl.
CPC .......... *H04N 5/2354* (2013.01); *H04N 5/2256* (2013.01); *H04N 5/2351* (2013.01); *H04N 9/3176* (2013.01); *H04N 9/3182* (2013.01); *H04N 9/3194* (2013.01)

(58) Field of Classification Search
CPC ............. H04N 5/2354; H04N 5/2351; H04N 5/2256; H04N 9/3194; H04N 9/3176; H04N 1/0272; H04N 2250/54; G01B 11/254; G01B 11/255; G01B 11/25; G06T 2207/10152; H04M 1/0272; H04M 2250/54
USPC ............... 348/128, 234, 333.1, E5.138, 744, 348/E15.058, E9.05; 356/603, 604, 605; 250/329; 353/1, 28–90
See application file for complete search history.

(56) References Cited

U.S. PATENT DOCUMENTS 4,703,344 A 10/1987 Hisano
5,003,166 A * 3/1991 Girod ................. G01B 11/2513
250/201.4

(Continued)

FOREIGN PATENT DOCUMENTS

DE 102005061590 11/2006
EP 2364013 9/2011
(Continued)

OTHER PUBLICATIONS

Debevec, Paul, "Virtual Cinematography: Relighting Through Computation" USC Centers for Creative Technologies, published by IEEE Computer Society, Aug. 2006, pp. 57-63.
(Continued)

*Primary Examiner* — Tuan Ho
*Assistant Examiner* — Marly Camargo (57) ABSTRACT

A novel lighting system includes an image capture device, an image processor, and an image projector. In a particular embodiment, the image capture device captures and converts images of a subject into image data, the image processor generates illumination patterns based on the image data, and the image projector projects the illumination patterns onto the subject. Optionally, the lighting system includes a controlled feedback mechanism for periodically updating the illumination pattern. In a more particular embodiment, the lighting system continually updates the illumination pattern to illuminate the subject in real-time.

20 Claims, 9 Drawing Sheets

(51) Int. Cl.
*G01B 11/25* (2006.01)
*H04N 5/225* (2006.01)

(56) References Cited

U.S. PATENT DOCUMENTS

| | | | |
|---|---|---|---|
| 6,483,537 B1 | 11/2002 | Mayer, III | |
| 6,542,180 B1 | 4/2003 | Wasserman | |
| 6,628,298 B1 | 9/2003 | Debevec | |
| 6,742,901 B2 * | 6/2004 | Kimura | H04N 5/74 348/E5.137 |
| 7,199,793 B2 | 4/2007 | Oh | |
| 7,218,324 B2 | 5/2007 | Pfister | |
| 7,278,755 B2 * | 10/2007 | Inamoto | H04N 5/74 348/E5.137 |
| 7,436,403 B2 | 10/2008 | Debevec | |
| 7,443,443 B2 | 10/2008 | Raskar | |
| 7,492,375 B2 | 2/2009 | Toyama | |
| 7,581,837 B2 | 9/2009 | Whitehead | |
| 7,805,017 B1 | 9/2010 | Basso | |
| 7,855,732 B2 | 12/2010 | Williams | |
| 7,901,093 B2 | 3/2011 | Tan | |
| 8,773,514 B2 * | 7/2014 | Gharib | G01B 11/25 348/42 |
| 9,058,533 B2 * | 6/2015 | Fedorovskaya | G06K 9/2036 235/375 |
| 2002/0006282 A1 * | 1/2002 | Ushiro | H04N 13/0207 396/429 |
| 2005/0078116 A1 | 4/2005 | Sloan | |
| 2005/0180657 A1 | 8/2005 | Zhang | |
| 2006/0285080 A1 * | 12/2006 | Kurihara | G03B 21/14 353/70 |
| 2007/0115484 A1 | 5/2007 | Huang | |
| 2008/0016137 A1 | 1/2008 | Sun | |
| 2008/0143720 A1 | 6/2008 | Elmquist | |
| 2008/0259289 A1 * | 10/2008 | Nozaki | G03B 17/00 353/70 |
| 2009/0046254 A1 * | 2/2009 | De Vaan | G02B 27/48 349/8 |
| 2009/0161033 A1 * | 6/2009 | Kaise | H04N 9/3108 349/8 |
| 2010/0033682 A1 | 2/2010 | Laduke | |
| 2010/0134643 A1 | 6/2010 | Koishi | |
| 2010/0328677 A1 | 12/2010 | Debevec | |
| 2011/0134300 A1 * | 6/2011 | Chung | H04M 1/0254 348/333.01 |
| 2012/0052908 A1 * | 3/2012 | Kao | H04M 1/0202 455/557 |
| 2012/0154636 A1 * | 6/2012 | De Haan | G03B 15/02 348/234 |
| 2014/0307055 A1 * | 10/2014 | Kang | H04N 13/0239 348/47 |

FOREIGN PATENT DOCUMENTS

| | | |
|---|---|---|
| JP | 2007-206343 | 8/2007 |
| JP | 2010-268285 | 11/2010 |
| JP | 2010-271580 | 12/2010 |
| WO | 98/26583 | 6/1998 |
| WO | 2009/153852 | 12/2009 |
| WO | 2010/043922 | 4/2010 |

OTHER PUBLICATIONS

Irawan, P. et al "Simulating Low Vision in High Dynamic Range Scenes" Journal of Vision Aug. 13, 2004, vol. 4, No. 8.
Austin, Jim "HDR for the Love of Light: Vision from Nine Photographers" Apogee Photo Magazine, Feb. 2007.
Melexis "HDR Image Sensor for Night Vision Surveillance Security Systems" Jun. 2011.
http://www.hpl.hp.com/research/ptm/antikythera_mechanism.

* cited by examiner

LIGHTING SYSTEM AND METHOD FOR IMAGE AND OBJECT ENHANCEMENT

CROSS-REFERENCE TO RELATED APPLICATIONS

This application claims priority to U.S. Patent Provisional Application No. 61/610,293, filed 13 Mar. 2012, which is hereby incorporated by reference in its entirety.

BACKGROUND OF THE INVENTION

1. Field of the Invention

This invention relates generally to lighting systems, and more particularly to a lighting system with controlled image capture and illumination capabilities.

2. Description of the Background Art

There are many different types of lighting systems for enhancing or altering the appearance of real objects. Among the simplest form of such systems are those commonly used in art galleries to showcase still art work such as, for example, paintings, photographs, sculptures, etc. These systems typically include one or more lamps that continuously illuminate a subject from one or more fixed positions.

Although traditional fixed position lighting systems can enhance visibility and appearance to some degree, their capabilities are substantially limited by their inherent simplicity. For example, such systems typically illuminate an entire subject uniformly with a single specific lighting condition (e.g., intensity, color, etc.), thus making it unlikely to achieve lighting conditions that are optimal for enhancing the overall appearance of a subject. This is because a single subject typically has many different textures and/or colors that vary greatly and the optimal lighting conditions for one specific texture and/or color are not necessarily the optimal conditions for another. As another limitation, it is difficult to selectively isolate and enhance the appearance of specific details (e.g., certain colors, textures, patterns, etc.) on a subject without also illuminating adjacent details that are not of particular interest.

What is needed, therefore, is a lighting system that can employ multiple different lighting conditions simultaneously. What is also needed is a lighting system that can selectively enhance the appearance of isolated details of a subject. What is also needed is a lighting system that can render visible features of a subject that are not visible under normal lighting conditions.

SUMMARY

The present invention overcomes the problems associated with the prior art, by providing a lighting system that accurately enhances the visibility and/or appearance of specific details of an illuminated subject.

The lighting system includes an image capture device operative to capture an image of a subject as image data and an image processor coupled to receive the image data from the image capture device. The image processor is operative to generate an illumination pattern based at least in part on the image data. An image projector is coupled to receive the illumination pattern from the image processor and operative to project the illumination pattern on the subject.

In an example embodiment, the image capture device is adapted to capture image data indicative of an image formed by electromagnetic radiation that is outside of the visible spectrum (for humans). The image processor correlates the image data associated with the image formed by electromagnetic radiation outside the visible spectrum with other image data indicative of another image formed by electromagnetic radiation within the visible spectrum. By correlating the visible image data with the non-visible image data, a projection pattern can be generated that, when projected onto the subject, renders non-visible features visible.

In another example embodiment, the image capture device is a camera system of a mobile host device (e.g., a mobile phone, computer tablet, etc.). Optionally, the image projector is a removable accessory adapted to cooperate with the mobile host device. In another example embodiment, the image capture device, the image projector, and the image processor are integral parts of the mobile host device.

In one embodiment, the image capture device and the image projector are optically aligned. For example, the image projector and the image capture device are optically aligned using a beam splitter. In this example embodiment, the projector and the imager share one or more lenses in the optical path. Alternatively, the projection optics and the imaging optics can be separate.

In an example embodiment, the lighting system includes a subject illumination system operative to illuminate the subject while the image capture device captures images of the subject. In one embodiment, the lighting system is a self-contained device and the illumination source is an integral part of the device. In another example embodiment, the lighting system further includes an auxiliary lighting system interface and the illumination source is an auxiliary lighting system coupled to the auxiliary lighting interface. The illumination source can illumination the subject with light either inside or outside of the visible spectrum, or both.

Optionally, the illumination pattern can be generated based on a plurality of separate captured images of the subject. In that case, the image data is indicative of at least a first image of the subject and a second image of the subject. By way of example, the subject can be illuminated by the illumination source at a first intensity during capture of the first image. The subject is then illuminated by the illumination source at a second intensity (different from the first intensity) during capture of the second image. Alternatively, a plurality of images can be captured while the subject is illuminated at a uniform intensity, but from a variety of different angles. Using multiple captured images, the image processing system can generate a projection pattern that is a high dynamic range image of the subject.

A method of illuminating a subject is also described. The method includes the steps of converting a first image of a subject into image data, processing the image data to generate an illumination pattern, and projecting the illumination pattern on the subject. In one particular method, the first image of the subject is formed by electromagnetic radiation outside of the visible spectrum. In a more particular method, the step of processing the image data to generate an illumination pattern includes converting the image data of the first image (non-visible spectrum) into image data indicative of an image within the visible spectrum.

In an example method, the step of capturing a first image includes illuminating the subject while the first image is captured. In an even more particular embodiment, the step of capturing a first image of the subject further includes illuminating the subject at a first intensity level while the first image is captured, and capturing a second image of the subject while the subject is illuminated at a second, different intensity level. Optionally, the method further includes using the multiple images of the subject to generate a projection pattern that is a high dynamic range image of the subject.

Applications of the invention include, but are not limited to, manufacturing, prospecting, mining, museums and art galleries, consumer products, research, satellite photo analysis, education, meeting rooms, and theaters.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a lighting system that captures an image of a subject, generates an illumination pattern based on the captured image, and projects the illumination pattern back onto the subject. The projected illumination pattern enhances the appearance and/or visibility of the subject. In the following description, numerous specific details are set forth (e.g., specific subjects) in order to provide a thorough understanding of the invention. Those skilled in the art will recognize, however, that the invention may be practiced apart from these specific details. In other instances, details of well known digital image processing practices (e.g., object augmentation, pattern recognition, etc.) and components have been omitted, so as not to unnecessarily obscure the present invention.

Figure 1:
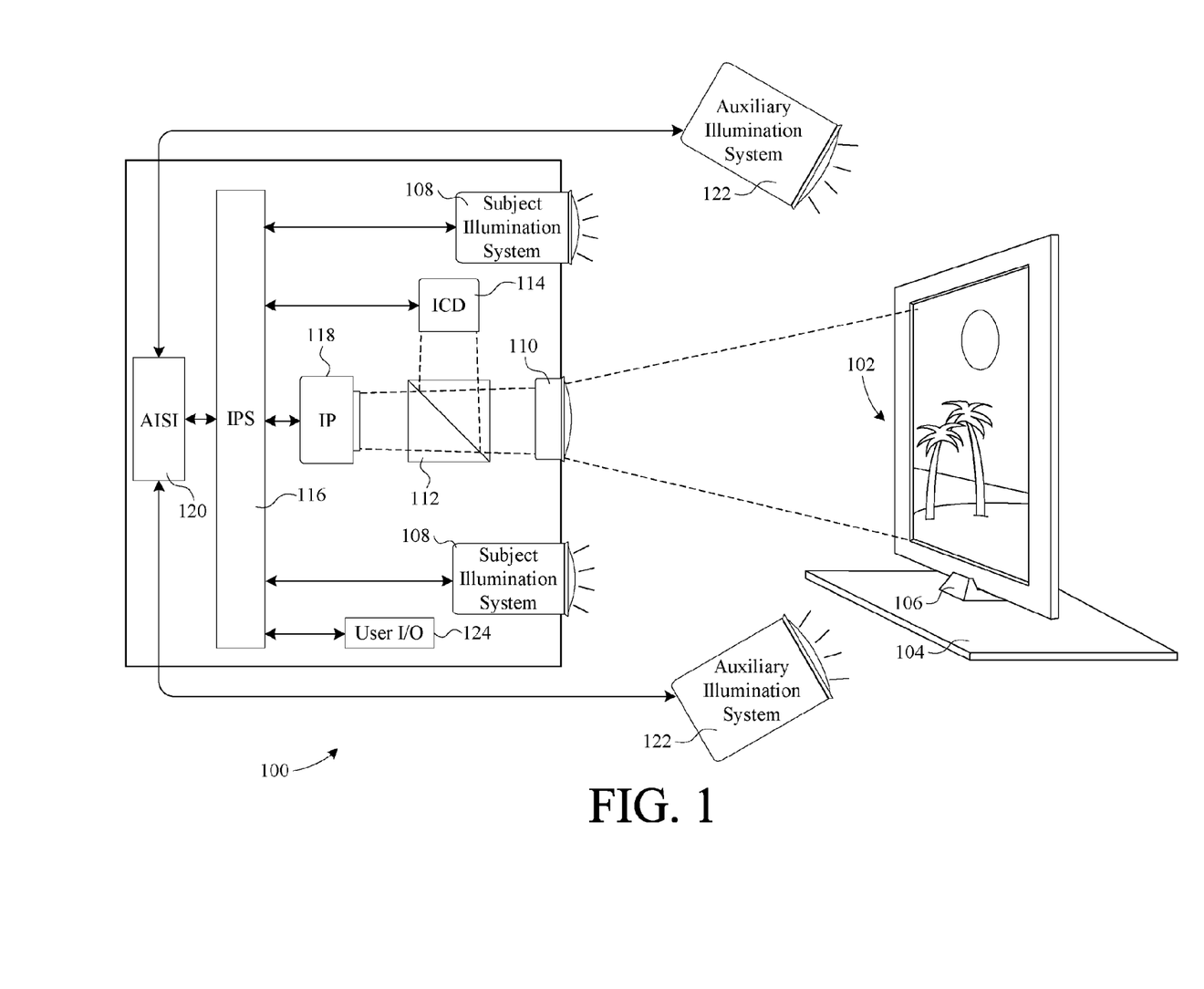
FIG. 1 shows a lighting system for enhancing the appearance and/or visibility of a subject.

FIG. 1 illustrates a lighting system 100 that enhances the appearance of a subject by capturing an image of the subject, generating an illumination pattern (e.g., a high contrast image of the subject), and projecting the illumination pattern back onto the subject. In this particular embodiment, lighting system 100 is shown illuminating a subject 102, which is depicted by way of example as a painting. Subject 102 is positioned on a subject platform 104 (e.g., a table top) by, for example, a small easel 106. Although subject 102 is a substantially two-dimensional object (i.e., a painting), system 100 can also be used to enhance the appearance of three-dimensional subjects including, but not limited to, sculptures, people, artifacts, manufactured parts/assemblies, stage props, architectural structures, and natural structures. Additionally, the illumination system of the present invention can be used to enhance the appearance of relatively small three-dimensional features (e.g., brush strokes, texture, etc.) in a substantially two dimensional object such as painting 102.

Lighting system 100 includes a subject illumination system 108, system optics 110, beam splitter 112, image capture device (ICD) 114, an image processing system (IPS) 116, an image projector (IP) 118, an auxiliary illumination system interface (AISI) 120, an auxiliary illumination system 122, and a user interface 124. Illumination system 108 includes one or more light sources disposed to sufficiently illuminate subject 102. System optics 110 focuses an image of subject 102 through beam splitter 112 and onto ICD 114. ICD 114 converts the optical image to data and communicates the image data to image processing system 116. Image processing system 116 processes the image data to generate projection patterns and communicates the projection patterns to image enhancing projector 118, which projects the patterns, through beam splitter 112 and system optics 110, onto subject 102. The patterns projected onto subject 102 are specifically designed to enhance the visibility of certain features of subject 102.

In this embodiment, subject illumination system 108 is a ring of lights operative to illuminate subject 102 while ICD 114 captures one or more images of subject 102. In the example embodiment, illumination system 108 includes a plurality of light sources that are coupled to, and controlled by, IPS 116 so as to synchronize subject illumination operations of illumination system 108 with image capture operations of ICD 114. Furthermore, each light source is selectively controlled by IPS 116 such that the exposure illumination conditions (i.e., intensity, color, source position, direction, etc.) can be varied.

System optics 110 is a lens system operative to focus an image of subject 102 through beam splitter 112 and onto ICD 114. In addition, illumination patterns projected by IP 118 through beam splitter 112 are also focused onto subject 102 via optics 110. Beam splitter 112 enables ICD 114 to capture images of subject 102 from the same perspective as that from which projector 118 projects illumination patterns onto subject 102. Alternatively, ICD 114 could be facing directly toward subject 102 on a separate optical axis than projector 118, thus eliminating the need for beam splitter 112.

ICD 114 is an electronic image capture device (e.g., CMOS sensor system, CCD sensor, etc.) operative to capture images of subject 102. Selection of an appropriate image capture device will depend on the intended use of the system. For example, if the system is intended to enhance the visibility of objects that are highly reflective for a certain wavelength of light, then the image capture device should be sensitive to that particular wavelength of light, whether or not that wavelength is in the visible spectrum. As another example, image capture devices can include filters to limit sensitivity to one or more particular spectral ranges. ICD 114 can be configured to take high resolution images or a stream of lower resolution images at some predetermined periodic interval, based on the particular application.

IPS 116 is coupled to receive image data from ICD 114 and generate an illumination pattern based on the image data. The particular image enhancing effect that the illumination pattern will add to the subject 102 will depend on the desired enhancement and, therefore, on the particular digital image processing techniques that are selected to process the image data to obtain the desired result. For example, to enhance the contrast of subject 102, the projected illumination pattern could be a high contrast version of the originally captured image that is generated by processing the image data using known contrast enhancing digital image processing techniques. It will be appreciated that the illumination pattern can be generated by processing the image data using any now known or yet to be developed digital image processing technique.

Image projector 118 is coupled to receive the illumination pattern from IPS 116 and project it through beam splitter 112 and onto subject 102. The particular type of projector will vary depending on the intended use. For example, image projector 118 could be any type of monochromatic or polychromatic projector system. Furthermore, any known projection technology could be implemented in the present invention. Such technologies include, but are not limited to, laser scanning, digital light processing (DLP), and liquid crystal on silicon (LCOS).

Auxiliary illumination system interface 120 facilitates communication between IPS 116 and auxiliary illumination system 122. Interface 120 could be, for example, an electrical port for establishing a wired connection with system 122. Alternatively, interface 120 could be a wireless transceiver for wirelessly communicating with auxiliary illumination system 122. As yet another example, interface 120 can be a computer bus connection.

System 122 includes external light sources (e.g., stage lighting system, subject display lighting, external image capture flash systems, etc.) that illuminate subject 102 for image capture purposes. Alternatively, system 122 could also include light sources that enhance the illumination of subject 102 for viewer observation purposes.

User I/O interface 124 includes user input/output device(s) (e.g., computer mouse, key pad, display screen, touchscreen display, etc.) that facilitate user interaction with image processing system 116.

The following is a description, by way of example, of the operation of lighting system 100 in an open loop single image capture mode. First, IPS 116 instructs illumination system 108, auxiliary illumination system 122, and ICD 114 to convert an image of subject 102 into image data. In response, illumination system 108 and auxiliary illumination system 122 illuminate subject 102 according to a predetermined illumination setting. Then, ICD 114 captures an image of subject 102 focused onto ICD 114 by optics 110 and beam splitter 112. IPS 116 receives the image data from ICD 114 and uses a preselected digital image processing technique to generate an illumination pattern (e.g., a processed version of the original captured image). Next, the processed image is communicated to projector 118, which projects the illumination pattern through beam splitter 112 and optics 110 onto subject 102. Optics 110 properly focuses the projected image on subject 102. The processed image remains projected on subject 102 until a user provides input via user I/O 124, which causes lighting system 100 to do otherwise.

The following is a description, by way of example, of the operation of lighting system 100 in a closed loop single image capture mode. First, IPS 116 instructs illumination system 108, auxiliary illumination system 122, and ICD 114 to convert an image of subject 102 into image data. In response, illumination system 108 and auxiliary illumination system 122 illuminate subject 102 according to a predetermined illumination setting. Then, ICD 114 captures an image of subject 102 focused onto ICD 114 by optics 110 and beam splitter 112. IPS 116 receives the image data from ICD 114 and uses a preselected digital image processing technique to generate an illumination pattern (e.g., a processed version of the original captured image). Next, the processed image is communicated to projector 118, which projects the illumination pattern through beam splitter 112 and optics 110 onto subject 102. Optics 110 properly focuses the projected image on subject 102. To this point, the operation of lighting system 100 is substantially the same as in the open loop mode. However, in the closed loop mode, the process is repeated in a closed loop fashion at a refresh rate sufficient to illuminate subject 102 in real-time. It should be understood that by projecting a modified image of subject 102 back onto subject 102 in real-time, the image enhancing effects added to subject 102 would be significantly less sensitive to relative motion between lighting system 100 and subject 102.

The following is a description, by way of example, of the operation of lighting system 100 in a closed loop multiple image capture mode. First, IPS 116 instructs system 108, system 122, and ICD 114 to convert a plurality of images of subject 102 into image data. In response, subject illumination system 108 and auxiliary illumination 122 illuminate subject 102 according to a first predetermined illumination setting. Then, ICD 114 converts a first image of subject 102 into image data. Next, subject illumination system 108 and auxiliary illumination system 122 illuminate subject 102 according to a second, different predetermined illumination setting. Then, ICD 114 captures a second image of subject 102. Next, IPS 116 receives the image data (first and second images of subject 102) from ICD 114 and uses a selected, predefined digital image processing technique to generate projection image data (e.g., a single high dynamic range image of subject 102) based at least in part on a portion of the first image data and at least a portion of the second image data. Next, the projection image data is communicated to projector 118, which projects the projection image onto subject 102 via optics 110. Then, the first step is repeated in a closed loop fashion at a refresh rate sufficient to maintain proper illumination of subject 102 in real-time. It should be understood that lighting system 100 can also be operated in a open loop multiple image capture mode by simply not repeating the image capture and image processing steps.

Although the example embodiment of FIG. 1 is integrated into a single component, it should be understood that alternate embodiments of the invention could be implemented with discrete components. For example, in an alternate embodiment, image enhancing projector 118 and optics 110 are embodied in a conventional projector, image capture device 114 is a digital camera or camcorder (with its own separate optics), and image processing system 116 is hosted on a personal computer.

Figure 2:
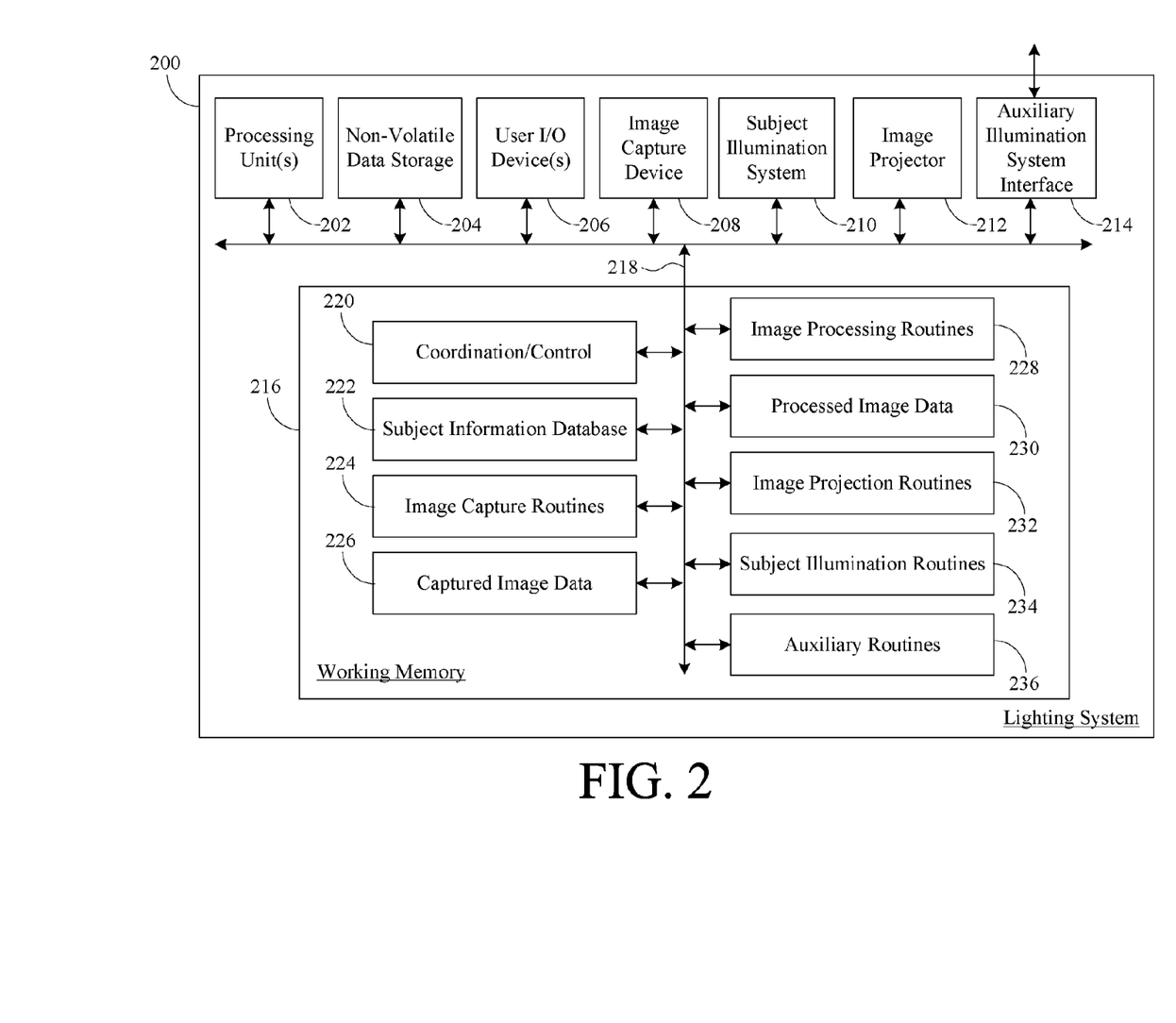
FIG. 2 is a block diagram of a microprocessor-based lighting system for enhancing the appearance and/or visibility of a subject.

FIG. 2 is a block diagram of a microprocessor based lighting system 200 according to another embodiment of the present invention. System 200 includes one or more processing units 202, non-volatile data storage 204, one or more user input/output devices 206, an ICD 208, a subject illumination system 210, an image projector 212, an auxiliary illumination system interface 214, and a working memory 216, all interconnected via a system bus 218.

Processing unit(s) 202 execute(s) data and code stored in working memory 216, causing system 200 to carry out its various functions. Non-volatile memory 204 (e.g., read-only memory, hard drive(s), etc.) provides storage for data and code (e.g., boot code and programs) that are retained even when lighting system 100 is powered down. I/O devices 206 facilitate interaction between a user and system 200. ICD 208 provides a means for capturing images of a subject. Illumination system 210 provides a means for illuminating the subject while ICD 208 captures an image of the subject. Image projector 212 provides a means for projecting illumination patterns on the subject. Auxiliary illumination system interface 214 provides a means of communication (e.g., wireless connection, direct electrical connection, etc.)

between system 200 and an auxiliary lighting/illumination system. Finally, system bus 218 facilitates intercommunication between the various components of system 200.

Working memory 216 (e.g., random access memory) provides temporary storage for data and executable code, which is loaded into working memory 216 during start-up and operation. Working memory 216 includes a coordination/control module 220, a subject information database 222, image capture routines 224, captured image data 226, image processing routines 228, processed image data 230, image projection routines 232, subject illumination routines 234, and auxiliary routines 236.

The contents of working memory 216 provide the following functions. Coordination/control module 220 provides overall coordination and control of the various running programs. Subject information database 222 stores settings (e.g., contrast settings, colors/patterns to highlight, image processing operating mode, subject specific information, etc.) associated with the subject. Image capture routines 224 provide functionality for controlling image capture device 208, for synchronizing the operation of ICD 208 with illumination system 210, and any other operations necessary to convert an optical image of a subject to image data. Captured image data includes unprocessed image data form ICD 208 that will be used for generating illumination patterns. Image processing routines 228 generate processed image data (e.g. illumination patterns/images) based on the captured image data 226. Processed image data 230 includes illumination patterns/images generated by image processing routines 228. Image projection routines 232 provide functionality for controlling image projector 212 to accomplish the projection of images stored in processed image data module 230. Subject illumination control routines 234 control subject illumination system 210 to properly illuminate the subject during image capture by, for example, synchronizing the operation of illumination system 210 with ICD 208. Auxiliary routines 236 facilitate coordination and control of auxiliary lighting systems connected to auxiliary illumination system interface 214.

Figure 3:
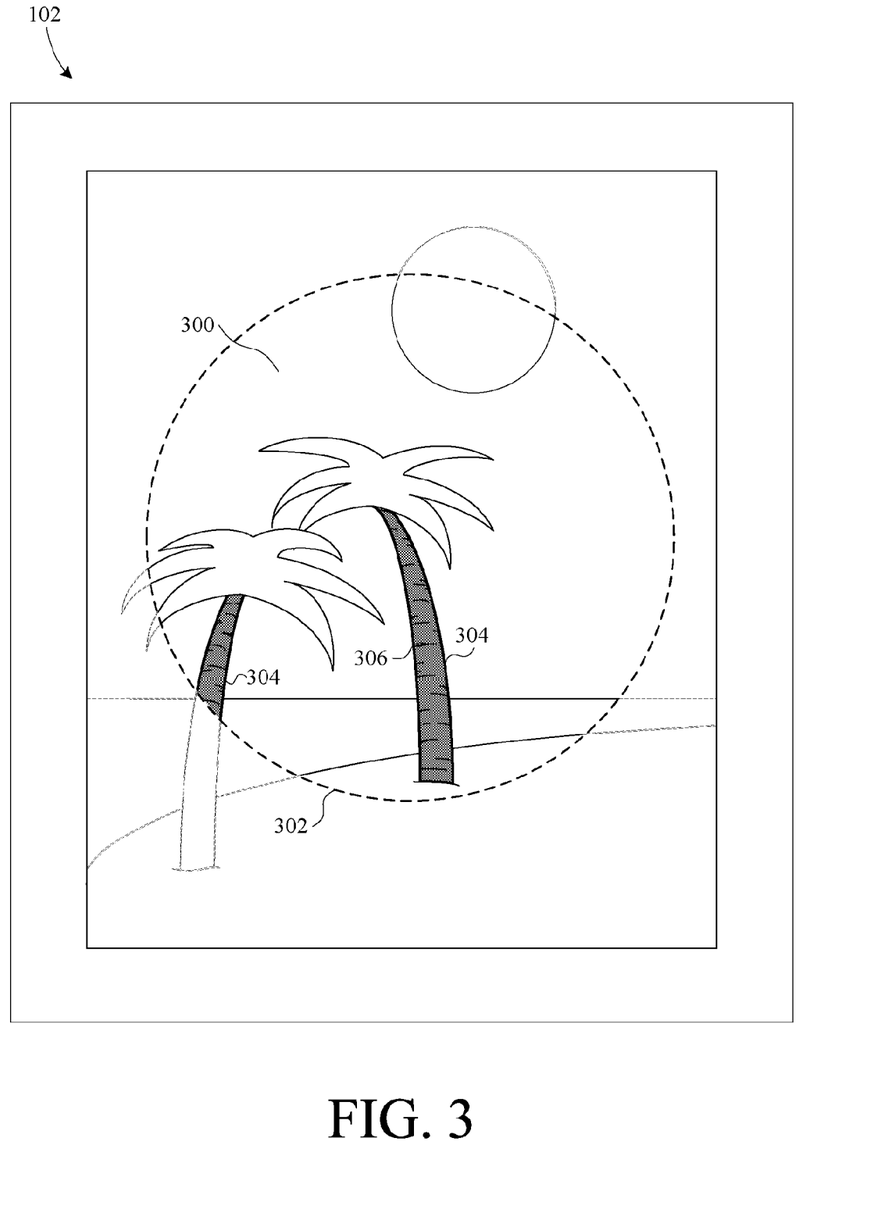
FIG. 3 shows a front view of a subject illuminated by the system of FIG. 1 or the system of FIG. 2.

FIG. 3 shows a front view of subject 102 illuminated by lighting system 100 according to an illumination pattern generated by processing image data via multiple digital image processing techniques. For illustrative purposes, only part of subject 102 (the portion enclosed by circle 302) is shown illuminated. It should be understood, however, that the projected image would illuminate all of subject 102.

This particular illumination scheme illustrates an example in which several illumination effects have been used to enhance the appearance of subject 102. For example, the contrast between the palm tree trunks 304 and the adjacent background has been increased significantly by digital image processing algorithms that adjust the colors and shades of tree trunks 304 in the originally captured image to a range of colors and shades with a higher degree of contrast to the background. The range of colors and shades to which those from the original image are adjusted can be decided by either specific user inputs or automatically adjusted by IPS 116.

Another effect added by a digital image processing technique shows physical surface details that are ordinarily not visible in ordinary lighting conditions. As shown, there are horizontal brush marks 306 on the tree trunks which are only visible in illuminated area 300 of subject 102. To achieve this effect, the illumination pattern is a single image generated based on multiple images of subject 102 captured while subject 102 was illuminated from different illumination source positions. This technique separates specular reflections at various angles from diffuse reflections such that the location of small physical features (i.e. surface texture) can be identified. With such features identified, an illumination pattern that best highlights the features is generated and projected on subject 102. As with known digital image processing techniques, the visibility of unwanted features (e.g., damaged portions of a painting or other subject) can also be reduced or eliminated.

Figure 4:
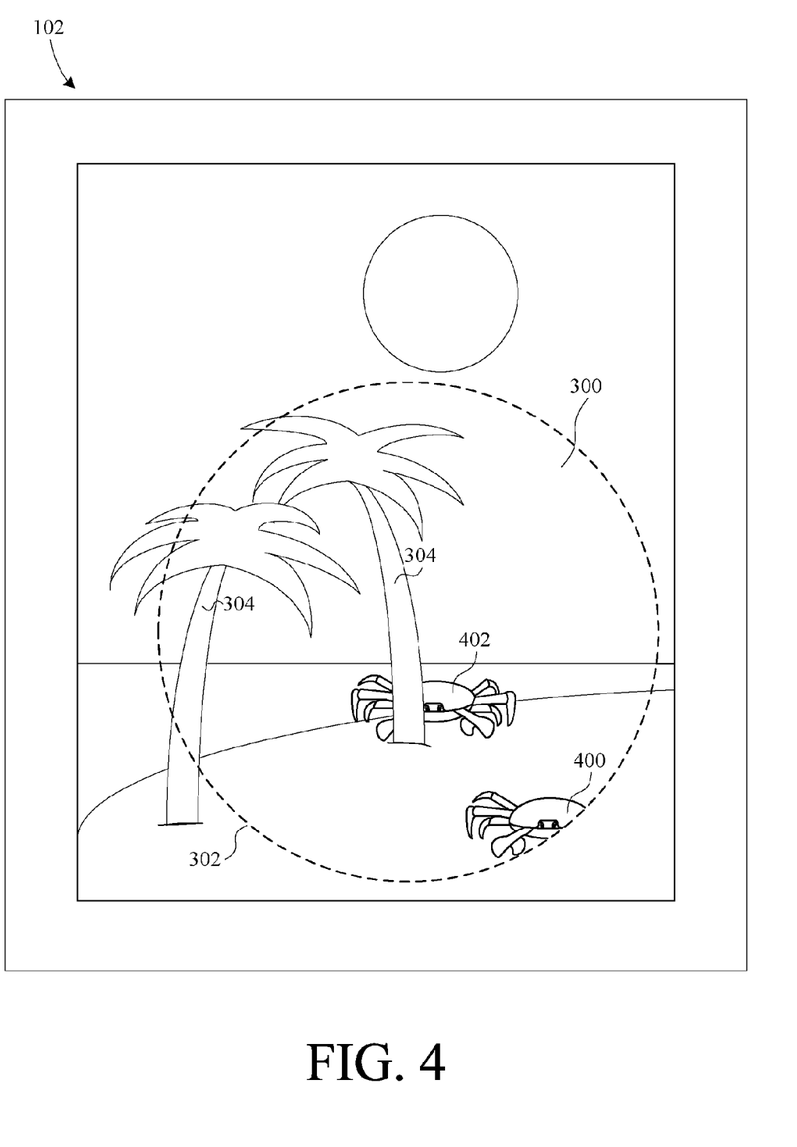
FIG. 4 shows another front view of the subject of FIG. 3 illuminated by the system of FIG. 1 or the system of FIG. 2.

FIG. 4 shows a front view of subject 102 illuminated by lighting system 100 according to another illumination pattern generated by processing image data to include augmented objects. In this particular illumination pattern, a fixed object 400 and an active object 402 are inserted into the scene of subject 102. As shown, fixed object 400 and active object 402 are depicted as crabs appearing to be part of the original scene. Fixed object 400 illustrates an example of projecting an object onto a subject in response to image processor system 116 analyzing the image data and determining that a predetermined condition has been met. For example, the image processing system 116 could project an object into a scene when the image data shows that some projected pointer (e.g. crosshair) is aligned with a particular object. Active object 402 illustrates a motion picture type of object that appears to be moving around the scene of subject 102. Active object 402 not only moves around the scene of subject 102, it also interacts with various features in order to create a more realistic illusion. For example, object 402 is shown walking behind a palm tree such that it is only partly visible, yet it becomes completely visible when it moves into the open. This is accomplished by generating the projected image based on the captured image of the subject. Furthermore, object 402 appears to get bigger as it approaches the lower region of subject 102 such that it appears to be getting closer. Another valuable aspect of the present invention is that the illumination patterns projected on the subject can be made responsive to user actions. For example, if image processor system 116 identifies the presence of a user's finger near object 402, it can respond by making object 402 appear to elude the user's finger by fleeing behind a palm tree. Again, this is accomplished by generating the projected image based on the captured image of the subject, which would include the user's finger.

Figure 5:
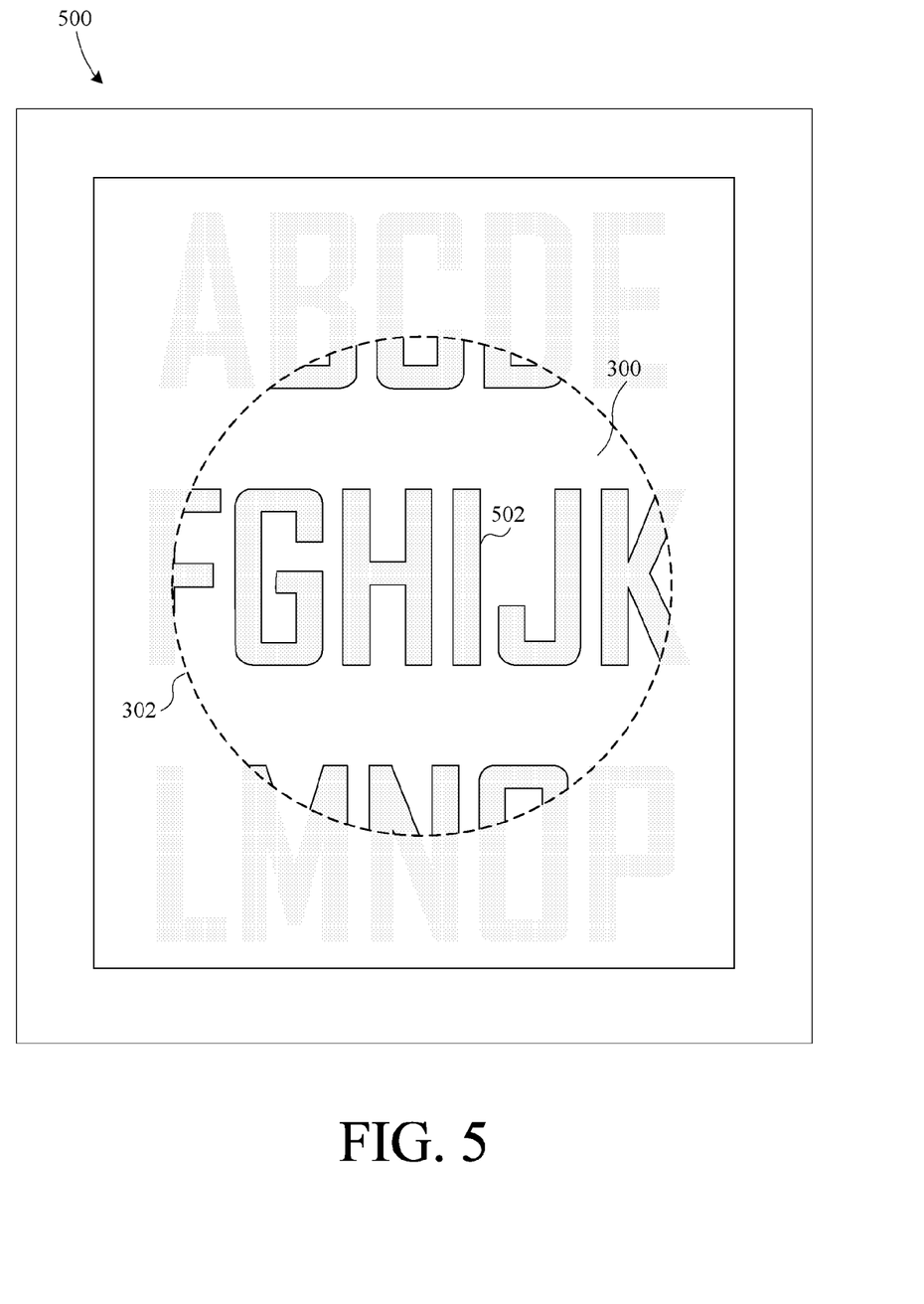
FIG. 5 shows a front view of another subject illuminated by the system of FIG. 1 or the system of FIG. 2.

FIG. 5 shows a front view of an alternate subject 500 illuminated by lighting system 100 with another type of illumination pattern. Subject 500 is a picture of low visibility text that is enhanced to be more visible. As shown, the text within area 300 is outlined with a high visibility boundary 502 that is augmented into the illumination pattern. Boundary 502 is an effect of processing the image data with a digital image processing technique that adds a highly visible color or shade at the interface where two faint colors or shades meet. Optionally, digital image processing techniques that recognize patterns (i.e. text) can also be used to increase the visibility. Upon recognizing a familiar letter, it can be made more visible in a variety of different ways including, but not limited to, applying a highly visible boundary, increasing contrast, changing one color to another color, etc. Such enhancements can also be continuously toggled between different states (e.g., blinking).

Figure 6:
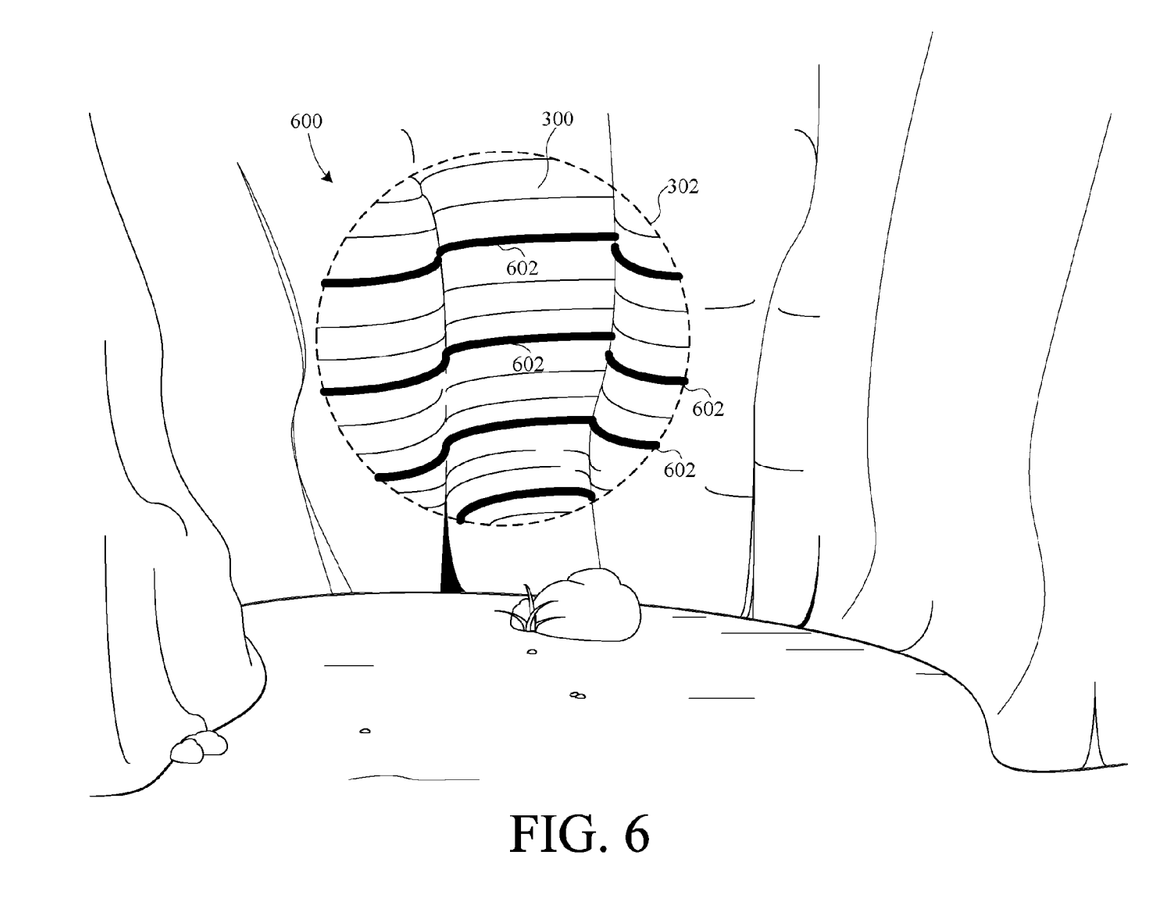
FIG. 6 shows a front view of another subject illuminated by the system of FIG. 1 or the system of FIG. 2.

FIG. 6 shows an alternate subject 600 illuminated by lighting system 100 to illustrate another aspect of the present invention. According to this aspect of the invention, lighting system 100 is able to make visible features of a subject that are not visible to the human eye under normal lighting conditions. Subject 600 is depicted as a cave wall comprising a plurality of mineral layers 602 that are not visible outside of area 300. In a particular embodiment, ICD 114 is spectrally sensitive to electromagnetic radiation beyond the range visible to the human eye. To make the minerals visible, image processing techniques manipulate the image data by adjusting the pixel values associated with the mineral in the image to values that can be represented in the spectral range visible to the human eye. The processed image of subject 600 is projected back onto subject 600 such that the minerals are shown in real-time. Optionally, illumination system 108 projects light within a specific spectral range that, when projected on the minerals, is either visible to ICD 114 or to the human eye.

Figure 7:
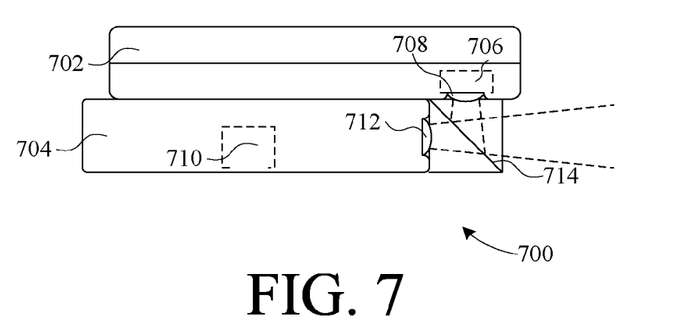
FIG. 7 shows a side view of another lighting system.
Figure 8:
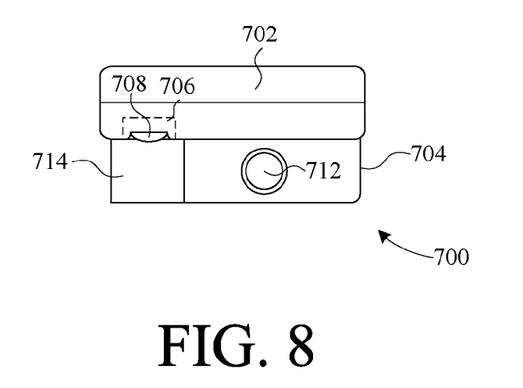
FIG. 8 shows a top view of the lighting system of FIG. 7

FIG. 7 and FIG. 8 show a side view and a top view, respectively, of a lighting system 700 according to another embodiment of the present invention. Lighting system 700 includes a mobile device 702 and an image projector 704 mounted and electrically coupled to one another. Mobile device 702 is, for example, a cellular phone that includes a camera 706 having a lens 708 through which an image of a subject is focused and converted into image data. Projector 704 includes an image processor 710, projection lens 712, and a mirror 714. Image processor system 710 is adapted to receive image data from mobile device 702 and generate an illumination pattern based on the image data. Projector lens 712 is operative focus the illumination pattern back on to the subject. Mirror 714 is operative to deflect an image of a subject into camera lens 708 of mobile device 704.

Figure 9:
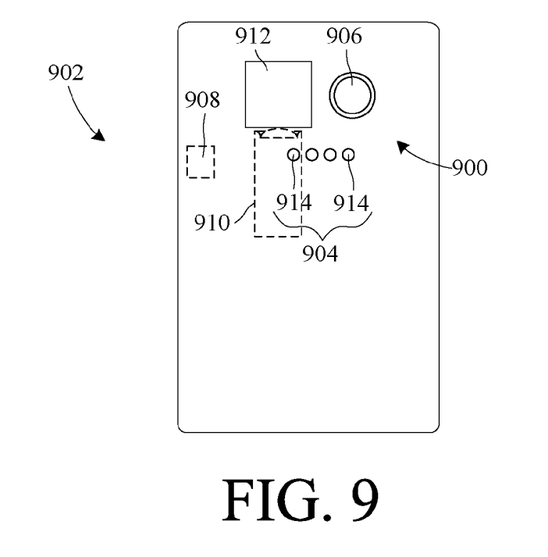
FIG. 9 shows a rear view of yet another lighting system.
Figure 10:
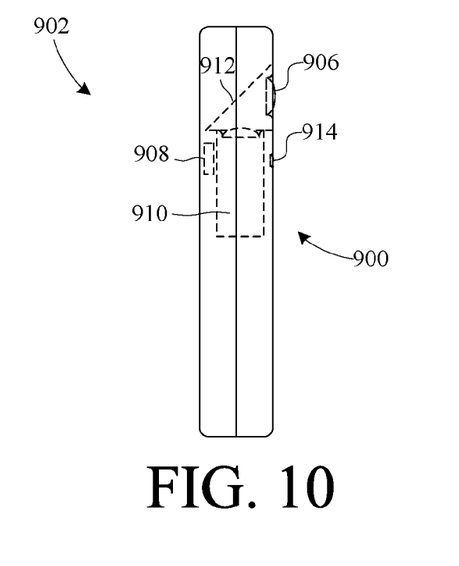
FIG. 10 shows a side view of the lighting system of FIG. 9.

FIG. 9 and FIG. 10 show a rear view and a side view, respectively, of a lighting system 900 incorporated into a mobile device 902. In this particular embodiment, lighting system 900 includes an illumination system 904, a camera 906, an image processor system 908, a projector 910, and a mirror 912. Illumination system 904 includes a plurality of light sources 914 for illumination a subject while camera 906 captures an image of the subject. Image processor system 908 is coupled to receive image data from camera 906 and generate an illumination pattern based on the image data. Projector 910 is coupled to receive the illumination pattern and project it onto mirror 912 where it is reflected onto the subject.

Figure 11:
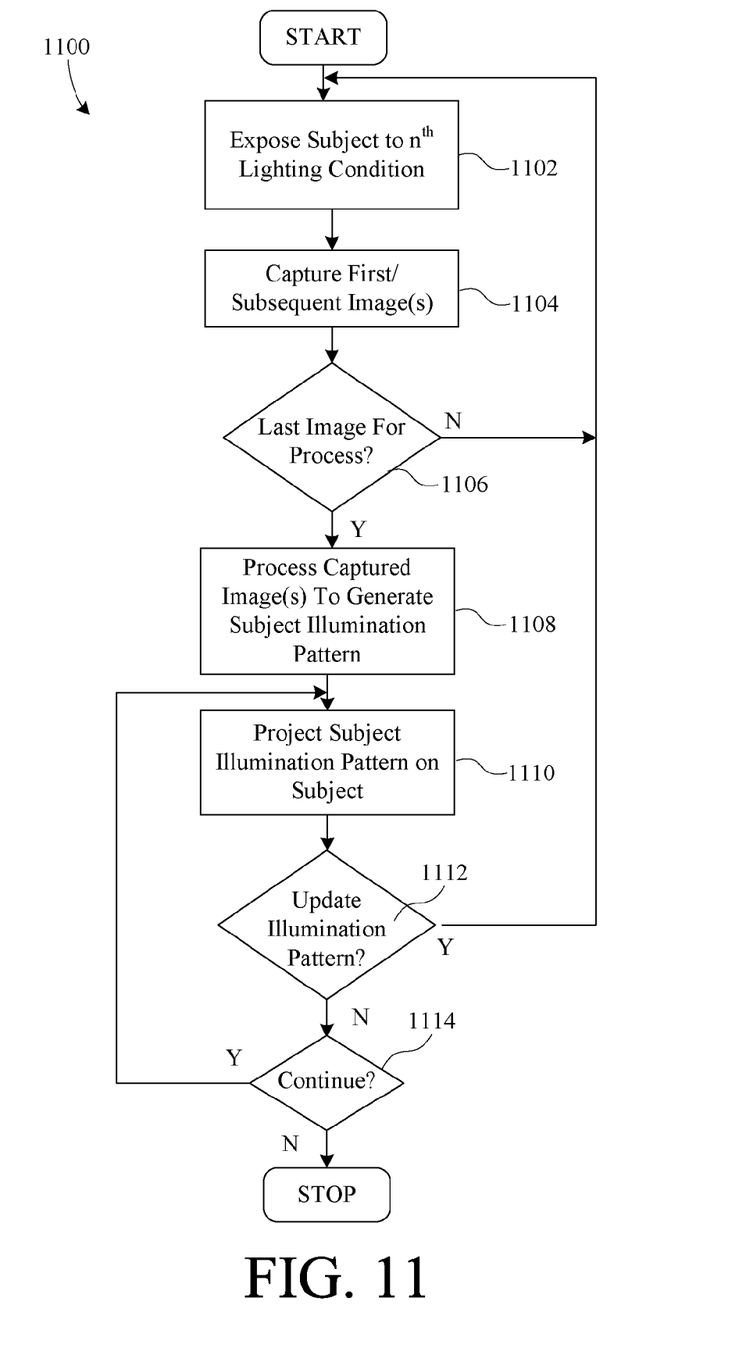
FIG. 11 shows a flow chart summarizing one method for illuminating an object.

FIG. 11 is a flow chart summarizing an example method 1100 of illuminating a subject. In a first step 1102, the subject is exposed to an nth lighting condition (i.e., a first or subsequent lighting condition). Then, in a second step 1104, the first or a subsequent image is captured. Next, in a third step 1106, it is determined whether the captured image is the last image for the process. If so, method 1100 continues to a fourth step 1108. Otherwise, method 1100 returns to first step 1102. In fourth step 1108, captured image(s) are processed to generate a subject illumination pattern. Next, in a fifth step 1110, the subject illumination pattern is projected on the subject. Then, in a sixth step 1112, it is determined whether the illumination pattern should be updated. If so, method 1100 returns to first step 1102. Otherwise, the method continues to a seventh step 1114, wherein it is determined whether the process should continue. If so, method 1100 continues fifth step. Otherwise, method 1100 ends.

The description of particular embodiments of the present invention is now complete. Many of the described features may be substituted, altered or omitted without departing from the scope of the invention. For example, alternate digital image processing techniques (e.g., sharpness adjustment, color correction, etc.), may be substituted for the previously described digital image processing techniques. As another example, alternate environments (e.g., an assembly line or other moving platform) can serve as the subject platform. The illumination system could then be used to selectively illuminate areas of materials with specific optical properties, highlighting flaws or contamination, or identifying incorrectly aligned parts requiring corrective measures. As yet another example, the image processing routines can used previously stored information about a subject (e.g., color correcting a print of a painting with known color targets and areas, using pattern matching techniques to project what a scene might have looked like beyond the borders of the current image, etc.). As yet another example, the system can be used as an input device, by projecting screens of information on various hand-drawn images and/or automatically color in or finish sketches. As yet another example, the system can allow the use of a regular laser pointer to draw on the projected screen, or use different color lasers to select for different kinds of interaction (e.g., green draws, red moves objects around, etc.), thus allowing multiple users to interact simultaneously with the same screen without requiring any additional hardware beyond the laser pointers. In addition, the ability to present interactive content could be used in theaters. These and other deviations from the particular embodiments shown will be apparent to those skilled in the art, particularly in view of the foregoing disclosure.

I claim:

1. A lighting system comprising:
    an image capture device operative to capture an image of a subject as image data;
    an image processor coupled to receive said image data from said image capture device, said image processor being operative to generate an illumination pattern based at least in part on said image data;
    an image projector coupled to receive said illumination pattern and operative to project said illumination pattern on said subject; and
    a subject illumination system operative to illuminate said subject while said image capture device captures one or more images of said subject; and
    wherein said image data is indicative of at least a first image of said subject and a second image of said subject, said subject being illuminated by said subject illumination system at a first intensity during the capture of said first image, said subject being illuminated by said subject illumination system at a second intensity during the capture of said second image, and said first intensity being different than said second intensity.

2. A lighting system according to claim 1, wherein said image capture device is adapted to capture image data indicative of an image formed by electromagnetic radiation that is outside the visible spectrum.

3. A lighting system according to claim 2, wherein said image processor is operative to convert at least some of said image data indicative of an invisible image formed by electromagnetic radiation that is outside the visible spectrum into converted image data indicative of a visible image formed by electromagnetic radiation within the visible spectrum.

4. A lighting system according to claim 3, wherein said image processor is operative to generate said illumination pattern based at least in part on said converted image data such that said illumination pattern renders an invisible feature of said subject visible when said illumination pattern is projected on said subject.

5. A lighting system according to claim 1, wherein said image capture device is a camera system of a mobile host device.

6. A lighting system according to claim 5, wherein said image projector is a removable accessory adapted to cooperate with said mobile host device.

7. A lighting system according to claim 5, wherein said image capture device, said image projector, and said image processor are integral parts of said mobile host device.

8. A lighting system according to claim 5, wherein said mobile host device is a cellular phone.

9. A lighting system according to claim 1, wherein said image capture device and said image projector are optically aligned.

10. A lighting system according to claim 9, further including a beam splitter disposed to direct an image of said subject to said image capture device and to direct said illumination pattern onto said subject.

11. A lighting system according to claim 1, wherein said projection pattern is a high dynamic range image of said subject.

12. A lighting system according to claim 1, wherein:
said lighting system is embodied in a self-contained device; and
said subject illumination system is an integral part of said device.

13. A lighting system according to claim 1, further comprising an auxiliary lighting system interface.

14. A lighting system according to claim 1, wherein said subject illumination system includes:
a first light source operative to generate light at one of said first intensity and said second intensity; and
a second light source operative to generate light at the other of said first intensity and said second intensity.

15. A method for illuminating a subject, said method comprising:
controllably illuminating a subject with a subject illumination system while images of said subject are captured;
illuminating said subject at a first intensity with said subject illumination system while a first image of said subject is captured;
capturing a second image of said subject while said subject is illuminated with said subject illumination system at a second intensity, said second intensity being different than said first intensity;
converting said first image of said subject and said second image of said subject into image data;
processing said image data to generate an illumination pattern; and
projecting said illumination pattern with a projection system onto said subject.

16. A method according to claim 15, wherein said first image of said subject is formed by electromagnetic radiation outside of the visible spectrum.

17. A method according to claim 16, wherein said step of processing said image data to generate an illumination pattern includes converting said image data indicative of an image outside the visible spectrum into converted image data indicative of an image within the visible spectrum.

18. A method according to claim 17, wherein said illumination pattern renders an invisible feature of said subject visible when said illumination pattern is projected on said subject.

19. A method according to claim 17, wherein said subject illumination system includes:
a first light source operative to generate light at one of said first intensity and said second intensity; and
a second light source operative to generate light at the other of said first intensity and said second intensity.

20. A method according to claim 15, wherein said illumination pattern is a high dynamic range image of said subject.

* * * * *